US008925826B2

(12) United States Patent
Liu et al.

(10) Patent No.: US 8,925,826 B2
(45) Date of Patent: Jan. 6, 2015

(54) MAGNETIC STRIPE-BASED TRANSACTIONS USING MOBILE COMMUNICATION DEVICES

(75) Inventors: Jie Liu, Medina, WA (US); Nissanka Arachchige Bodhi Priyantha, Redmond, WA (US); Aman Kansal, Issaquah, WA (US); Suman Nath, Redmond, WA (US); Dimitrios Lymberopoulos, Bellevue, WA (US); Michel Goraczko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 13/100,238

(22) Filed: May 3, 2011

(65) Prior Publication Data

US 2012/0280035 A1 Nov. 8, 2012

(51) Int. Cl.
*G06K 19/06* (2006.01)
*G06Q 20/02* (2012.01)

(52) U.S. Cl.
CPC .................................. *G06Q 20/02* (2013.01)
USPC ............................ 235/492; 235/487; 235/488

(58) Field of Classification Search
USPC ................. 235/375, 379, 380, 454, 487, 492
See application file for complete search history.

(56) References Cited

U.S. PATENT DOCUMENTS

| 4,575,621 | A | 3/1986 | Dreifus |
| 6,850,916 | B1 | 2/2005 | Wang |
| 7,336,973 | B2 | 2/2008 | Goldthwaite et al. |
| 7,357,319 | B1 | 4/2008 | Liu et al. |
| 7,828,214 | B2 | 11/2010 | Narendra et al. |
| 7,844,255 | B2 | 11/2010 | Petrov et al. |
| 2002/0186845 | A1 | 12/2002 | Dutta et al. |
| 2004/0104268 | A1 | 6/2004 | Bailey |
| 2004/0199474 | A1 | 10/2004 | Ritter |
| 2005/0247787 | A1 | 11/2005 | Von Mueller et al. |
| 2005/0269401 | A1* | 12/2005 | Spitzer et al. ................. 235/380 |
| 2007/0130085 | A1 | 6/2007 | Zhu |
| 2007/0178881 | A1 | 8/2007 | Teunissen et al. |

(Continued)

FOREIGN PATENT DOCUMENTS

EP 0203683 A2 12/1986
WO 2010/022129 A1 2/2010

OTHER PUBLICATIONS

Smart Card Alliance, LLC, Proximity mobile payments: Leveraging NFC and the contactless financial payments infrastructure, Sep. 2007, pp. 1-39.

(Continued)

*Primary Examiner* — Michael G Lee
*Assistant Examiner* — Tabitha Chedekel
(74) *Attorney, Agent, or Firm* — Steve Wight; Judy Yee; Micky Minhas

(57) ABSTRACT

Magnetic stripe-based transaction enabled mobile communication device embodiments are presented which generally involve a mobile communication device which has been configured to perform transactions that heretofore were completed using a magnetic stripe found on magnetic-stripe cards. In one general embodiment, a mobile communication device generates magnetic stripe data which is used to perform a magnetic stripe-based transaction. To this end, the mobile communication device includes a magnetic stripe device and a computing device. The computing device stores the magnetic stripe data, and the magnetic stripe device is employed to transfer the stored magnetic stripe information so that it can be used to conduct transactions as if a traditional magnetic stripe card were being used.

15 Claims, 6 Drawing Sheets

(56) References Cited

U.S. PATENT DOCUMENTS

| | | | |
|---|---|---|---|
| 2007/0194113 A1* | 8/2007 | Esplin et al. | 235/383 |
| 2008/0040265 A1* | 2/2008 | Rackley, III et al. | 705/40 |
| 2008/0126260 A1 | 5/2008 | Cox et al. | |
| 2008/0167017 A1 | 7/2008 | Wentker et al. | |
| 2009/0159663 A1 | 6/2009 | Mullen et al. | |
| 2009/0159672 A1* | 6/2009 | Mullen et al. | 235/380 |
| 2010/0243732 A1 | 9/2010 | Wallner | |
| 2010/0270373 A1 | 10/2010 | Poidomani et al. | |
| 2011/0047074 A1 | 2/2011 | Cai | |
| 2011/0077052 A1 | 3/2011 | Narendra et al. | |

OTHER PUBLICATIONS

Cashless society: Mobile phones could replace cash and credit cards, Jan. 24, 2011, retrieved Feb. 17, 2011 from http://www.prophecynewswatch.com/2011/January24/2471.html, pp. 1-2.

TJJM Publishing Square-cell phone credit card reader, Feb. 28, 2010, retrieved Feb. 18, 2011 from http://phonecreditcardreader.com/square-the-cell-phone-credit-card-reader, pp. 1-4.

Levine, Barry, iPhone 5 and iPad 2 could make credit cards obsolete, Jan. 25, 2011, retrieved Feb. 18, 2011 from http://www.worldtech24.com/business/iphone-5-and-ipad-2-could-make-credit-cards-obsolete, pp. 1-4.

Zhang, Q., J. N. B. Moita, K. Mayes and K. Markantonakis, The secure and multiple payment system based on the mobile phone platform, pp. 1-15, Aug. 2004, Smart Card Centre Information Security Group, Royal Holloway, University of London.

"Office Action Received for European Patent Application No. 12779609.2", Mailed Date: Sep. 15, 2014, 6 pages.

"Search Report Received in European Patent Application No. 12779609.2", Mailed Date: Sep. 1, 2014, 7 pages.

"OMAP™ 4 Mobile Applications Platform", Published in Texas Instruments, Mar. 28, 2011, 7 pages.

Harris, Adam et al., "Magnetic Stripe Card Spoofer", Published on: Aug. 4, 2008, Available at: http://hackaday.com/2008/08/04/magnetic-stripe-card-spoofer/.

Oliver, John, "AVR Flux Synthesizer: Magnetic Stripe Emulator", Published on: Dec. 3, 2010, Available at: https://www.youtube.com/watch?v=JBi-R2S2aDO.

Powerpants, "Magnetic Stripe Card Spoofer", Published on: Mar. 20, 2011, Available at: https://web.archive.org/web/20110320045210/http://www.instructables.com/id/Magnetic-stripe-card-spoofer/.

* cited by examiner

MAGNETIC STRIPE-BASED TRANSACTIONS USING MOBILE COMMUNICATION DEVICES

BACKGROUND

Magnetic stripe-based transactions are quite common in today's commence. Typically, a magnetic card provider (such as a bank or store) issues a card with a magnetic stripe (such as a credit card or debit card) to a user. The information needed to complete a transaction is recorded onto the card's magnetic stripe. When a user wishes to use the card in a magnetic stripe-based transaction, he or she (or a third party such as a cashier) typically inserts or swipes the card through a magnetic stripe card reader. This reader reads the information recorded on the magnetic stripe of the card and uses it to complete the transaction.

SUMMARY

The magnetic stripe-based transaction enabled mobile communication device embodiments described herein generally involve a mobile communication device which has been configured to perform transactions that heretofore were completed using a magnetic stripe found on magnetic-stripe cards. In one general embodiment, a mobile communication device generates magnetic stripe data. This data (or information) is of the type that can be recorded on a magnetic stripe of a magnetic stripe card to enable that card to perform a magnetic stripe-based transaction. To accomplish the foregoing, the mobile communication device includes a magnetic stripe device and a computing device. The computing device stores the aforementioned magnetic stripe information.

As for the aforementioned magnetic stripe device, this is generally employed to transfer the stored magnetic stripe information so that it can be used to conduct transactions as if a traditional magnetic stripe card were being used. The magnetic stripe data can be transferred in a number of ways. For example, in one general implementation, the magnetic stripe device is a magnetic stripe emulator that emulates the stored magnetic stripe data. In this implementation, the emulated data is transferred to a magnetic stripe card reader to perform the magnetic stripe-based transaction. In another general implementation, the magnetic stripe device is a magnetic stripe writer that records the stored magnetic stripe data onto a magnetic stripe of a magnetic stripe card.

It is noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of magnetic stripe-based transaction enabled mobile communication device embodiments reference is made to the accompanying drawings which form a part hereof, and in which are shown, by way of illustration, specific implementations. It is understood that other implementations may be utilized and structural changes may be made without departing from the scope of the described embodiments.

1.0 Magnetic Stripe-Based Transaction Enabled Mobile Communication Device

Figure 1:
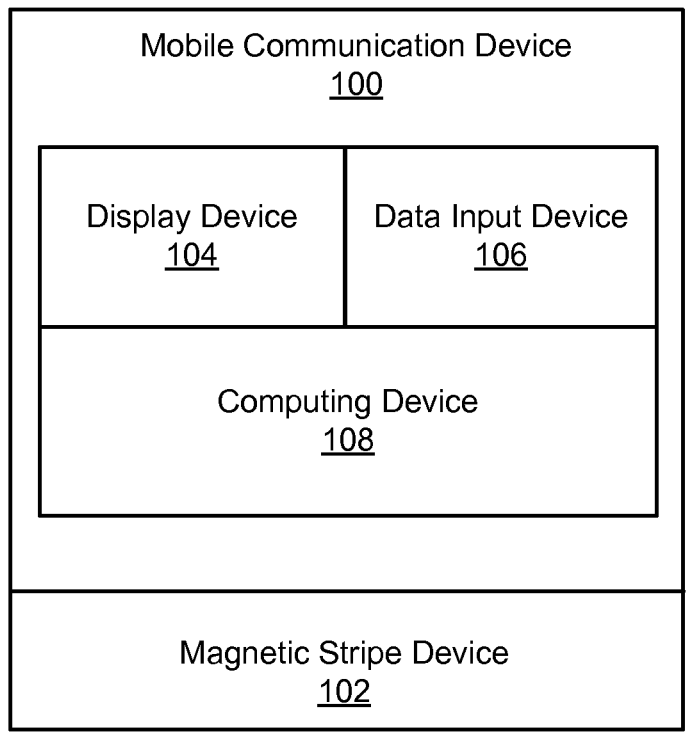
FIG. 1 is a simplified diagram of a general implementation of a magnetic stripe-based transaction enabled mobile communication device.

The magnetic stripe-based transaction enabled mobile communication device embodiments described herein generally involve a mobile communication device (such as a mobile phone including smart phones, personal digital assistant (PDA), netbook and notebook computers, tablet computers, wi-fi enabled digital music players, and so on), which has been configured to perform transactions that heretofore were completed using a magnetic stripe found on magnetic-stripe cards (such as a credit card, debit card, ATM card, loyalty card, rewards card, points card, advantage card, club card, and so on). More particularly, referring to FIG. 1, in one general embodiment a mobile communication device 100 generates magnetic stripe data of the type that can be recorded on a magnetic stripe of a magnetic stripe card to enable that card to perform a magnetic stripe-based transaction. To this end, the mobile communication device 100 includes a magnetic stripe device 102, a display device 104, a data input device 106 and a computing device 108 (such as the computing devices described in Section 2.0). The computing device 108 includes a computer program having program modules which are executed to store the aforementioned magnetic stripe information and to transfer the stored magnetic stripe information so that it can be used to conduct transactions as if a traditional magnetic stripe card were being used.

In general, the aforementioned stored magnetic stripe information is associated with a card account established for a user of the mobile communication device by a card provider. Examples of the types of magnetic strip card accounts include, but are not limited to, credit card accounts, ATM card accounts, loyalty card accounts, frequent flyer accounts, membership accounts, store credit accounts, and so on. In one implementation, magnetic stripe information is stored for multiple card accounts. This involves storing separate identifying data for each of the card accounts. The identifying information is displayed on the aforementioned display (e.g., 104 in FIG. 1) of the mobile communication device, and can include, for example, at least one of: an account number associated with the card account; or the name of the card; or a card or card provider logo; or one or more images representing a magnetic stripe card associated with the card account (such as images of the front and back of a magnetic stripe card); or an expiration date associated with the card account; or a digital version of a user's signature; or a security number associated with the card account; among other things.

In addition to the aforementioned identifying information stored for each card account, in one implementation other types of data related to an account can also be stored and associated with that account. For example, promotional data associated with a card account can be stored. This promotional data can include, for example, coupons, advertisements, other types of incentives, and so on. In one implementation, information pertaining to a card account or its uses that is entered by a user of the mobile communication device via a data input device (e.g., 106 in FIG. 1), such as a keypad, keyboard, touch screen, voice recognition system and so on, is also stored and associated with that account. The promotional and/or user-input information is displayed on the display of the mobile communication device. In one implementation, this information is displayed along with the associated account's identifying information. In another implementation, one or more links are displayed with an account's identifying information that when selected by the user cause the promotional and/or user-input information to displayed.

It is noted that in a situation where the identifying data, and potentially promotional and/or user-input information, associated with one or more of the card accounts cannot be displayed on the display of the mobile communication device owing to size constraints, a browsing function is employed. More particularly, a browsing command is input via an input device of the mobile communication device which allows a user to display information associated with card accounts that are not currently displayed (such as by scrolling the card account information on the display). Additionally, in one implementation, a searching function is included for finding and displaying card account information when display size constraints preclude all the information from being displayed at once. More particularly, a search command is input via an input device of the mobile communication device which allows a user to then enter a query concerning a card account. The query is processed and results in the identifying data associated with one or more of the card accounts having attributes matching the search query to be displayed.

As stated previously, the magnetic stripe-based transaction enabled mobile communication device embodiments described herein are configured to perform magnetic-stripe cards transactions by generating magnetic stripe data. Generally, this involves a user of the mobile communication device inputting a selection command via a data input device (e.g., 106 of FIG. 1) to select one of the card accounts. For example, the user could select one of the displayed accounts. In the context of a credit card account, a user can select the account (if there are more than one stored) he or she wants to use to make a credit purchase from the stored accounts, and then the aforementioned magnetic stripe device (102 in FIG. 1) is employed to complete the transaction as if it were a traditional magnetic stripe card.

The magnetic stripe data can be transferred in a number of ways. For example, in one general implementation, the magnetic stripe device is a magnetic stripe emulator that emulates the stored magnetic stripe data associated with a selected card account. In this implementation, a program module is included in the computer program which transfers the emulated data to a magnetic stripe card reader to perform the magnetic stripe-based transaction. In another general implementation, the magnetic stripe device is a magnetic stripe writer that records the stored magnetic stripe data onto a magnetic stripe of a magnetic stripe card. In either of the foregoing implementations, the magnetic stripe device can be integrated into a chassis of the mobile communication device, or it can be a stand-alone accessory that is connected to and in communication with the mobile communication device via a wired or wireless connection. A more detailed description of the foregoing implementations will be provided in sections 1.2 and 1.3.

The magnetic stripe-based transaction enabled mobile communication device embodiments described herein have many advantages. For example, a user can use a single mobile communication device to make purchases and perform other magnetic stripe card operations in lieu of carrying multiple magnetic stripe cards in a purse, or wallet, or the like. Thus, for example, this makes for a thinner wallet since there is no need to carry the cards. It also reduces the chance that such cards can be lost or stolen. Another advantage to a user is that he or she will always have access to all their card accounts, even those that are not used frequently--such as a gift card, or loyalty card, or rebate card. There are also significant advantages to magnetic stripe card providers, and to merchants that accept magnetic stripe cards for payment and other purposes. For example, since the magnetic stripe-based transaction enabled mobile communication device embodiments described herein mimic the magnetic stripe data typically found on the stripe of a magnetic stripe card, the existing infrastructure and equipment set up to read and process magnetic stripe cards (e.g., card readers, card processing software, and so on) need not be replaced or upgraded. Another advantage to smaller card providers is that the embodiments described herein level the playing field. With physical magnetic stripe cards a user may be reluctant to carry less frequently used card such as a store card, or a card for purchasing a particular brand of merchandise. Often a card user would opt to carry one or more universal cards that can be used practically anywhere. However, with the embodiments described herein, since it is just as easy to store and use magnetic stripe information for a particular store or brand account as it is a universal card account, a user is more likely to use a smaller card provider's account, thereby benefitting that enterprise more than if a universal card account was used.

1.1 Communication-Based Features

Because the magnetic stripe-based transaction enabled mobile communication device embodiments described herein involve the use of a communication device, a variety of advantageous features can be realized. For example, in one implementation the magnetic stripe information for an account is input into the mobile communication device via a communication channel and stored. For example, in cases where the mobile communication device is in communication with a computer network (such as the Internet or a proprietary intranet) the magnetic stripe information can be downloaded by the device from a provider's site.

In addition to using a communication channel to download magnetic stripe information, other information (such as the previously described identifying data and promotional information) can be downloaded in the same manner. Further, one-time use scenarios become feasible. In a one-time use scenario, a provider would provide magnetic stripe information that can only be used once. For example, a user could purchase an item using the one-time use magnetic stripe information, and that information could not be used again to make another purchase. Such a scenario would be onerous in the context of physical magnetic stripe cards because a new card would have to be obtained after each use. However, with the embodiments described herein, the one-time use magnetic stripe information could be easily downloaded each time and there would be no need to obtain another card. This one-time use scenario has the advantage of reducing fraud because even if the magnetic stripe information got into the hands of a miscreant during its use, the information would be useless for future transactions.

Still further, in one implementation each time a card account is used, usage information is downloaded to the mobile communication device via a communication channel. For example, in the context of a purchase, this usage information can take the form of a purchase receipt thus allowing a user to track his or her expenses. This usage information can also be used to produce a purchase history for a card account. In addition, a user's purchase habits can be monitored, and in combination with other context information such as the user's current location, used to make suggestions to the user as to what card or card accounts to use for a particular transaction.

Another advantageous communication-based feature is gift cards. A traditional magnetic stripe gift card is typically a card that is bought and can then be used for purchases totaling to a prescribed, pre-paid amount. Often the gift card is limited to a particular store or company from whom these purchases can be made. However, with the embodiments described herein it is possible for a gift card provider to offer a gift card account to a user who if amenable would download the magnetic stripe information associated with that account to his or her mobile communication device where it would be stored. The user could then use the gift card account to make purchase, or even transfer the gift card account to another user for their use in making purchases.

1.2 Magnetic Stripe Emulator Implementation

Figure 2:
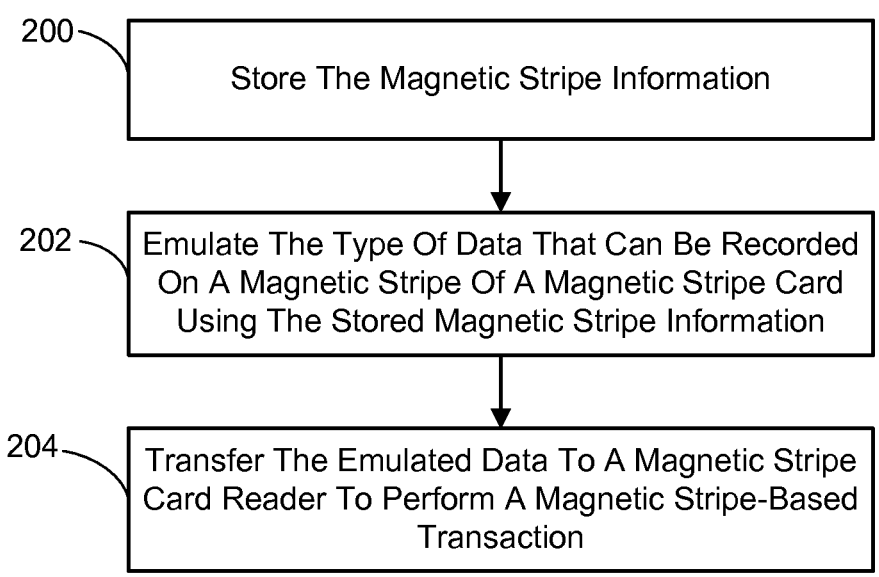
FIG. 2 is a flow diagram generally outlining one embodiment of a process for using a magnetic stripe-based transaction enabled mobile communication device that includes a magnetic stripe emulator to emulate stored magnetic stripe data.

As stated previously, the magnetic stripe-based transaction enabled mobile communication device embodiments described herein include an implementation where the magnetic stripe device is a magnetic stripe emulator that emulates the stored magnetic stripe data associated with a selected card account. More particularly, referring to FIG. 2, this implementation involves storing the magnetic stripe information for a card account (200), and then emulating the type of data that can be recorded on a magnetic stripe of a magnetic stripe card using the stored magnetic stripe information (202). The emulated data is then transferred to a magnetic stripe card reader to perform a magnetic stripe-based transaction (204).

Figure 3:
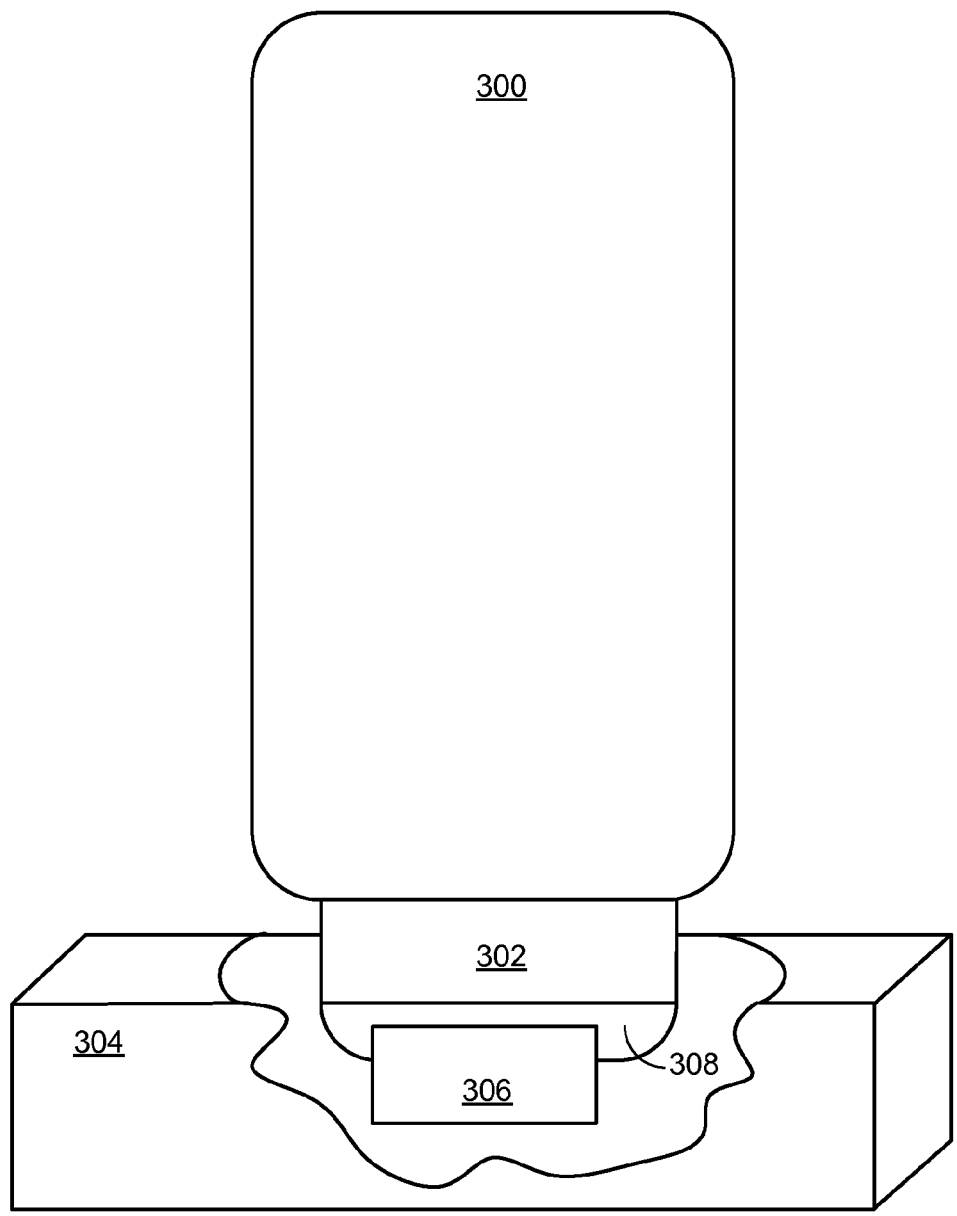
FIG. 3 is a simplified diagram showing a mode of a magnetic stripe emulator where transferring emulated magnetic strip information involves establishing physical contact between the magnetic stripe emulator of the mobile communication device and a reader head of a magnetic stripe card reader.

In one implementation, depicted in FIG. 3, transferring the emulated magnetic strip information involves establishing physical contact between the magnetic stripe emulator 302 of the mobile communication device 300 and a reader head 306 of the magnetic stripe card reader 304. In this implementation, the emulator 302 takes the shape of a credit card (or a portion thereof) that has an electrical interface 308 at a distal end thereof. The electrical interface 308 is a conventional interface of the type that interfaces with a magnetic stripe reader head 306 of a magnetic stripe card reader 304. The electrical interface 308 is held stationary (i.e., docked) against the reader head 306, and the emulated data is transferred (i.e., played) by the emulator 302 in a sequential manner that mimics a scenario where the emulated data is recorded in a sequence along a magnetic stripe and read by swiping the stripe past the magnetic stripe card reader head. The magnetic stripe card reader 304 receives the magnetic strip information from the emulator 302 and completes a transaction in the normal manner as if a conventional magnetic strip card where swiped passed the reader.

Figure 4:
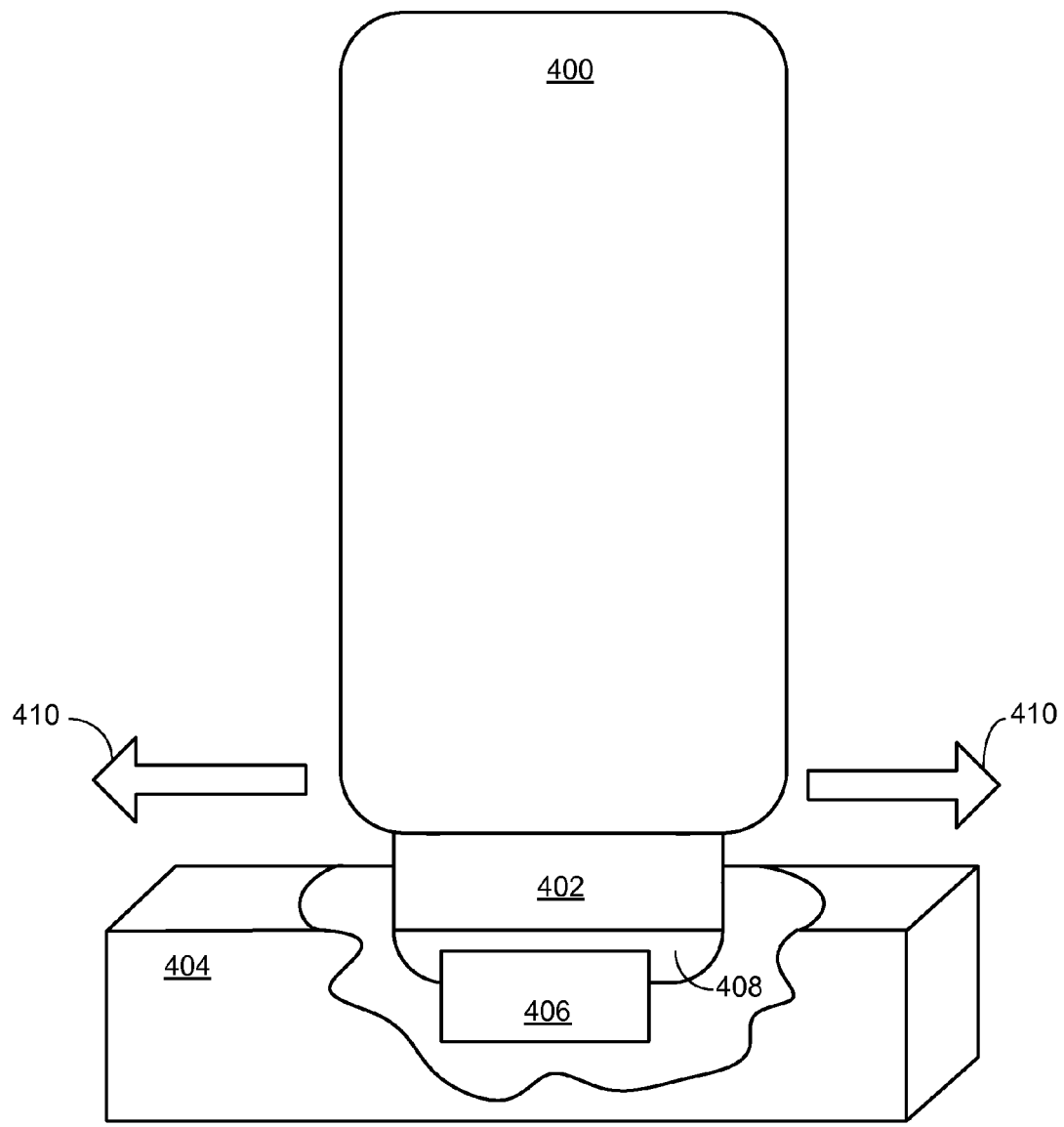
FIG. 4 is a simplified diagram showing another mode of a magnetic stripe emulator where transferring the emulated magnetic strip information involves swiping the magnetic stripe emulator of the mobile communication device across the reader head of the magnetic stripe card reader.

In another implementation, depicted in FIG. 4, transferring the emulated magnetic strip information involves swiping the magnetic stripe emulator 402 of the mobile communication device 400 across a reader head 406 of the magnetic stripe card reader 404. Here again, the emulator 402 takes the shape of a credit card (or a portion thereof) that has an electrical interface 408 at a distal end thereof. The electrical interface 408 is a conventional interface of the type that interfaces with a magnetic stripe reader head 406 of a magnetic stripe card reader 404. In this case, the emulator 402 emulates the magnetic stripe data sequentially along the electrical interface in a manner mimicking a scenario where the emulated data is recorded in a sequence along a magnetic stripe and read by swiping the stripe past the magnetic stripe card reader head. The electrical interface 408 is swiped along the reader head 406 (as indicated by the arrows 410) in the same manner as the magnetic stripe of a magnetic strip card is swiped across a reader head. The magnetic stripe information can be emulated before the emulator is swiped or during swiping. The magnetic stripe card reader 404 receives the magnetic strip information from the emulator 402 and completes a transaction in the normal manner as if a conventional magnetic strip card where swiped passed the reader.

In the foregoing implementations, the emulator can be an integral part of the mobile communication device (as shown in FIGS. 3 and 4) and electrically connected thereto by an internal interface, such as a General Purpose Input/Output (GPIO), memory slot, or other pins. Alternately, the emulator can be a separate, stand-alone unit from the mobile communication device and electrically connected thereto by an external interface, such as an audio jack, USB port, a proprietary port, or a wireless interface.

1.3 Magnetic Stripe Writer Implementation

Figure 5:
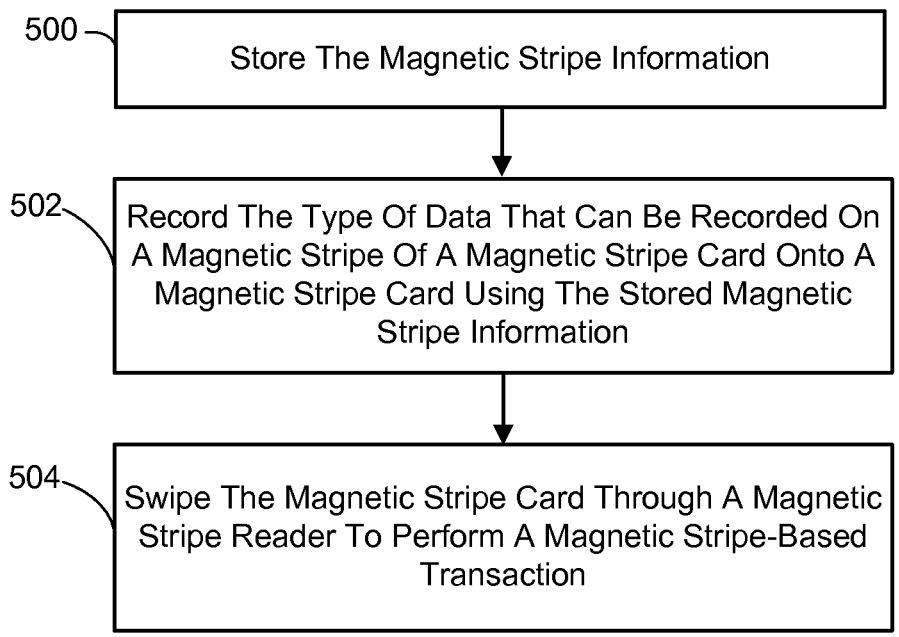
FIG. 5 is a flow diagram generally outlining one embodiment of a process for using a magnetic stripe-based transaction enabled mobile communication device that includes a magnetic stripe writer to write stored magnetic stripe data to a magnetic stripe of a magnetic stripe card.

The magnetic stripe-based transaction enabled mobile communication device embodiments described herein also include an implementation where the magnetic stripe device is a magnetic stripe writer that writes the stored magnetic stripe data associated with a selected card account to a magnetic stripe of a magnetic stripe card. More particularly, referring to FIG. 5, this implementation involves storing the magnetic stripe information for a card account (500), and then recording the type of data that can be recorded on a magnetic stripe of a magnetic stripe card onto a magnetic stripe card using the stored magnetic stripe information (502). The magnetic stripe card can then be swiped through a magnetic stripe reader to perform a magnetic stripe-based transaction (504) in the normal manner as if a conventional magnetic strip card where swiped passed the reader.

Figure 6:
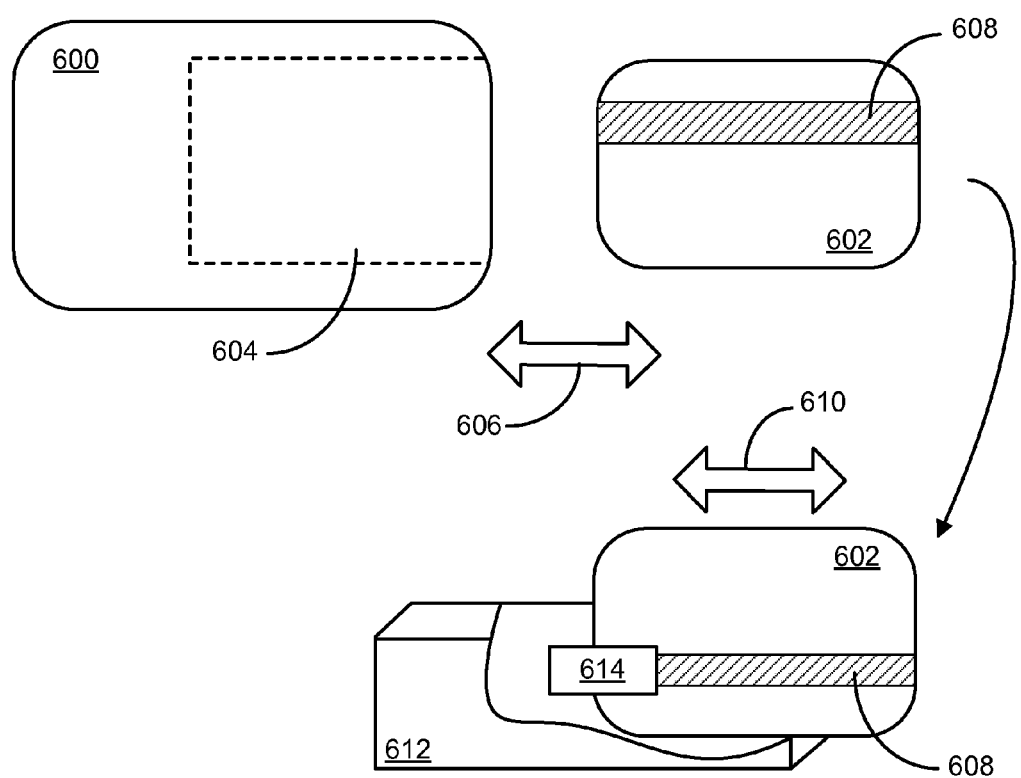
FIG. 6 is a simplified diagram showing an implementation of a magnetic stripe writer where recording magnetic strip information onto the magnetic stripe of a magnetic stripe card involves inserting the card into the writer such that the card can then be swiped across the reader head of the magnetic stripe card reader to complete a transaction.

In one implementation, depicted in FIG. 6, the aforementioned recording action involves first inserting the recordable magnetic stripe card 602 into the magnetic stripe writer 604, which in this implementation is integrated within the mobile communication device 600, and then removing the card (as indicated by the arrow 606). While the card 602 is inserted, the writer 604 records the magnetic stripe information onto the magnetic strip 608 of the card. The magnetic stripe card 602 is then swiped (as indicated by arrow 610) through a magnetic stripe card reader 612 such that the card's magnetic strip 608 passes by the head 614 of the reader. This magnetic strip information is read and used to complete a transaction in the normal manner.

Figure 7:
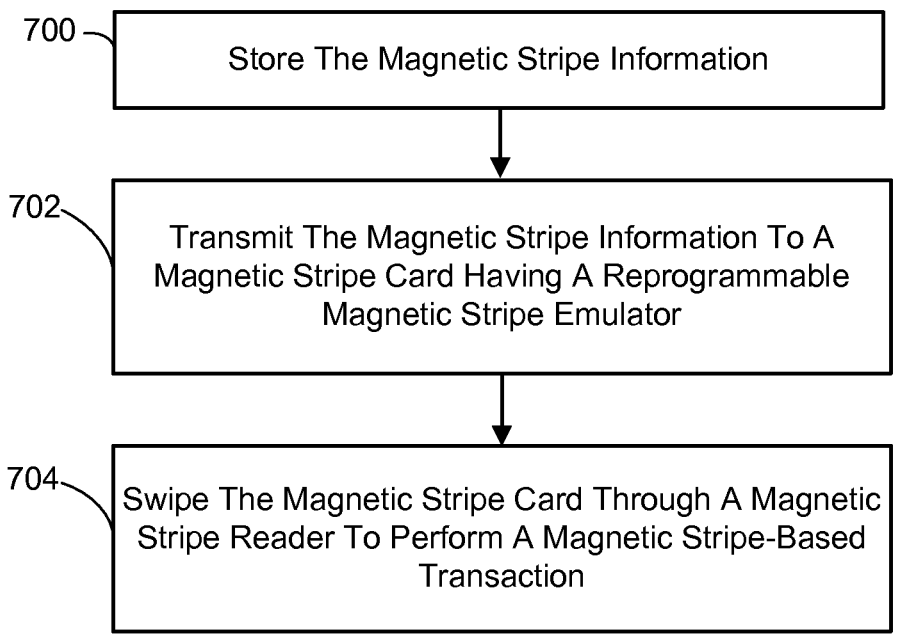
FIG. 7 is a flow diagram generally outlining one embodiment of a process for using a magnetic stripe-based transaction enabled mobile communication device having a magnetic stripe writer to write stored magnetic stripe data to a magnetic stripe card having a reprogrammable magnetic stripe emulator.

The magnetic stripe-based transaction enabled mobile communication device embodiments described herein further include an implementation where the magnetic stripe device is a magnetic stripe writer that writes the stored magnetic stripe data associated with a selected card account to a magnetic stripe card having a reprogrammable magnetic stripe emulator. More particularly, referring to FIG. 7, this implementation involves storing the magnetic stripe information for a card account (700), and then transmitting the magnetic stripe information to a magnetic stripe card having a reprogrammable magnetic stripe emulator (702). The magnetic stripe card can then be swiped through a magnetic stripe reader to perform a magnetic stripe-based transaction (704) in the normal manner as if a conventional magnetic strip card where swiped passed the reader.

It is noted that the magnetic stripe card having a reprogrammable magnetic stripe emulator employed in this latter implementation is conventional in that it includes a controller and an energy source (e.g., battery, rechargeable battery, or other energy storage). The controller is used to store magnetic stripe information and to emulate it using the card's reprogrammable magnetic stripe. However, such conventional cards typically do not include a communication interface for communicating with a mobile communication device. As such the foregoing implementation involves the use of a conventional magnetic stripe card having a reprogrammable magnetic stripe emulator that has been modified to add the aforementioned communication interface. It is further noted that the magnetic strip writer of the mobile communication device transfers the stored magnetic stripe information associated with a selected card account via a wired or wireless connection between the mobile communication device and the communication interface of the magnetic stripe card.

The magnetic stripe writer in either of the foregoing implementations can be an integral part of the mobile communication device (as shown in FIG. 6) and electrically connected thereto by an internal interface, such as a General Purpose Input/Output (GPIO), memory slot, or other pins. Alternately, the magnetic stripe writer can be a separate, stand-alone unit from the mobile communication device and electrically connected thereto by an external interface, such as an audio jack, USB port, or a proprietary port.

2.0 Exemplary Operating Environments

Figure 8:
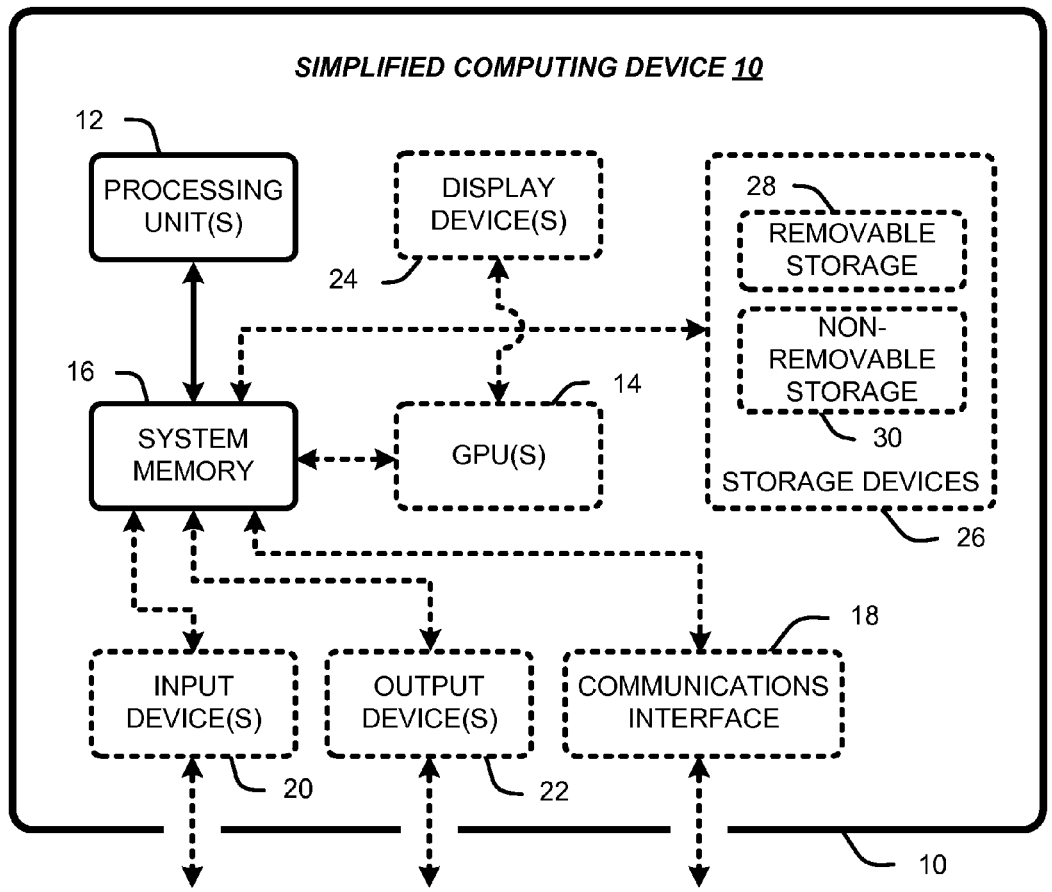
FIG. 8 is a diagram depicting a general purpose computing device constituting an exemplary system for implementing magnetic stripe-based transaction enabled mobile communication device embodiments described herein.

The magnetic stripe-based transaction enabled mobile communication device embodiments described herein are operational within numerous types of general purpose or special purpose computing system environments or configurations. FIG. 8 illustrates a simplified example of a general-purpose computer system on which various embodiments and elements of the magnetic stripe-based transaction enabled mobile communication device embodiments, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc. In the context of the embodiments described herein, it is assumed such a computing device is resident in the previously-described mobile communication device.

To allow a device to implement the magnetic stripe-based transaction enabled mobile communication device embodiments described herein, the device should have a sufficient computational capability and system memory to enable basic computational operations. In particular, as illustrated by FIG. 8, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 18. The simplified computing device of FIG. 8 may also include one or more conventional computer input devices 20 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 8 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the magnetic stripe-based transaction enabled mobile communication device embodiments described herein, or portions thereof, may be stored, received, transmitted, or read from any desired combination of computer or machine readable media or storage devices and communication media in the form of computer executable instructions or other data structures.

Finally, portions of the magnetic stripe-based transaction enabled mobile communication device embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It was described previously that in one implementation the magnetic stripe information for an account is input into the mobile communication device via a communication channel and stored. For cases where the mobile communication device is in communication with a computer network (such as the Internet or a proprietary intranet), it was stated that the magnetic stripe information can be downloaded by the device from a provider's site. However, this is not the only way magnetic strip information can be obtained by the mobile communication device. In one implementation, the magnetic stripe information is read directly from an existing magnetic stripe card. To this end, the mobile communication device includes a magnetic stripe reader that reads data from a magnetic stripe of a magnetic stripe card. Like the previously-described magnetic stripe writer, the reader can be an integral part of the mobile communication device and electrically connected thereto by an internal interface, or it can be a separate unit from the mobile communication device and electrically connected thereto by an external interface. In operation, a magnetic stripe card is placed in or swiped through the magnetic stripe reader. The magnetic stripe information found on the card's magnetic strip is captured from the magnetic strip and then stored.

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for using a mobile communication device having a magnetic stripe emulator to perform a magnetic stripe-based transaction, comprising:
   using a computer resident in the mobile communication device to perform the following process actions:
   storing information comprising magnetic stripe information for emulating the type of data that can be recorded on a magnetic stripe of a magnetic stripe card to enable that card to perform a magnetic stripe-based transaction;
   emulating said type of data that can be recorded on a magnetic stripe of a magnetic stripe card using the stored magnetic stripe information; and
   transferring the emulated data to a magnetic stripe card reader to perform the magnetic stripe-based transaction, said transferring comprising,
      establishing physical contact between the magnetic stripe emulator and a reader head of the magnetic stripe card reader, and
      without swiping the magnetic stripe emulator, transferring the emulated data sequentially over time so as to mimic a scenario where the emulated data is recorded in a sequence along a magnetic stripe and read by swiping the stripe past the magnetic stripe card reader head.

2. The process of claim 1, wherein said stored magnetic stripe information is associated with a first card account, and wherein the process action of storing information further comprises storing magnetic stripe information associated with one or more additional card accounts.

3. The process of claim 2, further comprising the process actions of:
   storing information comprising identifying data which separately identifies each of the card accounts;
   displaying said identifying data for the card accounts on a display resident in the mobile communication device; and
   inputting a selection command via an input device resident in the mobile communication device, said selection command selecting one of the card accounts; and wherein
   the emulating action comprises emulating the type of data that can be recorded on a magnetic stripe of a magnetic stripe card using the stored magnetic stripe information associated with the selected card account; and wherein
   the transferring action comprises transferring the emulated data associated with the selected card account to a magnetic stripe card reader to perform the magnetic stripe-based transaction.

4. The process of claim 3, wherein the identifying data associated with each card account comprises:
   an account number associated with the card account; and
   one or more images representing a magnetic stripe card associated with the card account; and
   an expiration date associated with the card account; and
   a security number associated with the card account.

5. The process of claim 3, wherein the identifying data associated with one or more of the card accounts cannot be displayed on the display of the mobile communication device owing to size constraints, and wherein the process further comprises a process action of inputting a browsing command via an input device resident in the mobile communication device, said browsing command allowing a user of the mobile communication device to display identifying data associated with card accounts that are not currently displayed on the mobile communication device's display.

6. The process of claim 3, wherein the identifying data associated with one or more of the card accounts cannot be displayed on the display of the mobile communication device owing to size constraints, and wherein the process further comprises a process action of inputting a search command via an input device resident in the mobile communication device, said search command allowing a user of the mobile communication device to enter a query concerning a card account, which results in the identifying data associated with one or more of the card accounts having attributes matching the search query to be displayed on the mobile communication device's display.

7. The process of claim 1, wherein said stored magnetic stripe information is associated with a card account established for a user of the mobile communication device by a card provider, and wherein the process further comprises at least one of the process actions of:
   storing information comprising promotional data associated with the card account, and displaying said promotional data on a display resident in the mobile communication device; or
   monitoring the user's purchase history, and providing said history information to the user; or
   monitoring the user's purchase history, and in combination with other context information such as the user's current location, suggesting to the user what card or card accounts to use for a particular transaction.

8. The process of claim 1, wherein said stored magnetic stripe information is associated with a card account established for a user of the mobile communication device by a card provider, and wherein the process further comprising the process actions of:
   inputting user-generated information pertaining to the card account or uses thereof via an input device resident in the mobile communication device,
   storing the inputted user-generated information; and
   displaying the stored user-generated information on a display resident in the mobile communication device.

9. A computer-implemented process for using a mobile communication device having a magnetic stripe writer to record data on a magnetic stripe of a magnetic stripe card, comprising:
   using a computer resident in the mobile communication device to perform the following process actions:
   storing information comprising magnetic stripe information for writing the type of data that can be recorded on a magnetic stripe of a magnetic stripe card to enable that card to perform a magnetic stripe-based transaction, said stored magnetic stripe information being associated with multiple card accounts established for a user of the mobile communication device by one or more card providers;
   storing information comprising identifying data which separately identifies each of the card accounts;
   monitoring the user's purchase history, and in combination with other context information, suggesting to the user whenever a magnetic stripe-based transaction is attempted what card account to use for a particular transaction by displaying said identifying data for the suggested card account on a display resident in the mobile communication device;
   inputting a selection command from the user via an input device resident in the mobile communication device that designates which card account to use for said particular transaction; and
   recording said type of data that can be recorded on a magnetic stripe of a magnetic stripe card onto a magnetic stripe card having a magnetic stripe using the stored magnetic stripe information associated with the card account designated by the user.

10. The process of claim 9, wherein the mobile communication device further comprises a magnetic stripe reader which reads data from a magnetic stripe of a magnetic stripe card, said process further comprising:
    storing information comprising magnetic stripe information captured when the magnetic stripe of a magnetic stripe card is read using the magnetic stripe reader of the mobile communication device; and
    recording the captured information onto a magnetic stripe of a magnetic stripe card to enable that card to perform a magnetic stripe-based transaction.

11. The process of claim 9, the magnetic strip card comprises a reprogrammable magnetic stripe emulator and a communication interface, and wherein the process action of recording said type of data that can be recorded on a magnetic stripe of a magnetic stripe card onto the magnetic stripe card using the stored magnetic stripe information, comprises transferring the stored magnetic stripe information associated with a selected card account via a wired or wireless connection between the mobile communication device and the communication interface of the magnetic stripe card.

12. A mobile communication device which generates the type of data that can be recorded on a magnetic stripe of a magnetic stripe card to enable that card to perform a magnetic stripe-based transaction, comprising:
    a magnetic stripe device comprising a magnetic stripe emulator which emulates said type of data that can be recorded on a magnetic stripe of a magnetic stripe card;
    an user input device;
    a display device;
    a memory device;
    a computing device; and
    a computer program comprising program modules executable by the computing device, wherein the computing device is directed by the program modules of the computer program to,
       store information on said memory device that comprises magnetic stripe information of the type that can be recorded on a magnetic stripe of a magnetic stripe card to enable that card to perform a magnetic stripe-based transaction, said stored magnetic stripe information being associated with a card account established for a user of the mobile communication device by a card provider,
       input user-generated information pertaining to the card account or uses thereof via the user input device,
       store the inputted user-generated information on said memory device,
       display the stored user-generated information on the display device,
       transfer said emulated data to a magnetic stripe card reader to perform the magnetic stripe-based transaction, said transferring comprising transferring the emulated data sequentially over time so as to mimic a scenario where the emulated data is recorded in a sequence along a magnetic stripe and read by swiping a stripe past a magnetic stripe card reader head of a magnetic stripe card reader after physical contact has been established between the magnetic stripe emulator and the reader head, and without swiping the magnetic stripe emulator.

13. The mobile communication device of claim 12, wherein the magnetic stripe device further comprises a magnetic stripe writer which records said type of data that can be recorded on a magnetic stripe of a magnetic stripe card onto a magnetic stripe card having a magnetic stripe using the stored magnetic stripe information.

14. The mobile communication device of claim 12, wherein the magnetic stripe device is integrated into a chassis of the mobile communication device.

15. The mobile communication device of claim 12, wherein the magnetic stripe device is a stand-alone accessory that is connected to and in communication with the mobile communication device via a wired or wireless connection.

* * * * *